（12）United States Patent
Noettling

(10) Patent No.: US 6,710,783 B2
(45) Date of Patent: Mar. 23, 2004

(54) PRESENTATION DEVICE

(75) Inventor: Alois Noettling, Pottenstein (DE)

(73) Assignee: Siemens Aktiengesellschaft, Münich (DE)

( * ) Notice: Subject to any disclaimer, the term of this patent is extended or adjusted under 35 U.S.C. 154(b) by 294 days.

(21) Appl. No.: 09/776,974

(22) Filed: Feb. 5, 2001

(65) Prior Publication Data

US 2001/0017624 A1 Aug. 30, 2001

(30) Foreign Application Priority Data

Feb. 4, 2000 (DE) .......................... 100 04 898

(51) Int. Cl.[7] .................................................. G09G 5/00
(52) U.S. Cl. ...................... 345/650; 345/420; 345/649; 345/652; 345/653; 345/654; 345/655
(58) Field of Search ................. 345/420, 619, 345/650, 652, 653, 654, 655

(56) References Cited

U.S. PATENT DOCUMENTS

| 5,463,722 | A | 10/1995 | Venolia |
| 5,644,689 | A | 7/1997 | Ban et al. |
| 5,712,965 | A | 1/1998 | Fujita et al. |
| 5,891,030 | A | 4/1999 | Johnson et al. |
| 6,040,839 | A | 3/2000 | Van Eldik et al. |

Primary Examiner—Mark Zimmerman
Assistant Examiner—Adam Arnold
(74) Attorney, Agent, or Firm—Schiff Hardin LLP

(57) ABSTRACT

In a presentation device for the two-dimensional presentation of the volume data elements of a volume dataset, parts of the volume dataset can be selected by prescribing boundary surfaces. The boundary surfaces are displaceable. The selected volume can be presented as a perspective image rotating around a basic rotational axis. The rotational axis is selectable dependent on the positions of the volume data elements of the selection dataset. The rotational axis can be automatically determined by a computer unit.

10 Claims, 4 Drawing Sheets

PRESENTATION DEVICE

BACKGROUND OF THE INVENTION

1. Field of the Invention

The present invention is directed to a presentation device for presenting a volume dataset with a number of volume data elements as a perspective, two-dimensional image rotatable around a basic rotational axis.

2. Description of the Prior Art

Presentation devices of the above type are known which have a data memory for storing the volume dataset, a computer unit for determining the image from the volume data elements of the volume dataset, a display unit, for example a monitor, at least for the presentation of the image and at least one input means, for example a keyboard and/or a mouse control. In such known devices, respective positions in the volume and a data value are allocated to each volume data element. The computer unit has at least one boundary surface prescribed to it via the input means on the basis of which the volume dataset is divided into a selection dataset and a remaining dataset that is complementary to the volume dataset. Only volume data elements that are contained in the selection dataset are utilized for the determination of the two-dimensional image.

Such presentation devices are employed in medical fields for the presentation of tomograms or other three-dimensional reconstructions of patient images, for example in X-ray angiography. An especially relevant region of the volume dataset can be selected in a simple way by suitably prescribing the boundary surface, and further boundary surfaces as well, if needed. By rotation of the image, the relevant region can be observed from different viewing angles.

In such known devices, the basic rotational axis usually proceeds through the center of gravity of the volume dataset, i.e. through the middle of the volume defined by the volume dataset. This is disadvantageous for some presentations. This disadvantage is particularly apparent when only a part of the volume dataset is displayed on the display unit, and the rotational axis lies outside the displayed volume region.

U.S. Pat. No. 5,891,030 discloses a device that reproduces tubular structures of a human body, for example the gastrointestinal tract, with the assistance of a CT scanner with a work station. The center line of the large intestine is thereby identified. The work station compiles CT data such that axial tomograms, transluminal cross-sectional images and intraluminal volume rendering images are shown.

U.S. Pat. No. 5,463,722 discloses an apparatus for the automatic alignment of manipulated objects in the two-dimensional and three-dimensional graphics space.

U.S. Pat. No. 5,644,689 discloses a method for a three-dimensional presentation from an arbitrary point of view that employs compressed voxel data that were produced by a direct search for voxel data representing an image of a subject.

SUMMARY OF THE INVENTION

An object of the present invention is to provide a presentation device that does not exhibit the aforementioned disadvantages of the known devices.

This object is achieved in a presentation device wherein that the basic rotational axis is selectable dependent on the positions of the volume data elements of the selection dataset, and in particular, is automatically determined by the computer unit dependent on the positions of the volume data elements of the selection dataset.

The invention allows namely, the basic rotational axis to be placed at least in the proximity of a selection volume defined by the selection dataset. The basic rotational axis preferably touches the selection volume, or intersects it.

The presentation is especially stable when the selection volume has a selection volume center of gravity and the basic rotational axis proceeds through the selection volume center of gravity.

The presentation is especially flexible in an embodiment wherein the image can be rotated around at least one auxiliary rotational axis, the auxiliary rotational axis intersecting the basic rotational axis, and wherein the auxiliary rotational axis is also selectable dependent on the positions of the volume data elements of the selection dataset. In particular, this auxiliary rotational axis can be automatically defined by the computer unit dependent on the positions of the volume data elements of the selection dataset. The above statements for the basic rotational axis apply by analogy to the positioning of the auxiliary rotational axis.

The advantages of the invention are particularly apparent when the image is scalable and/or displaceable.

Fundamentally, the boundary surface can also be an arbitrary, even a curved surface. Generally, however, it is a plane.

Fundamentally, the planes can be arbitrarily oriented in space. When the position of the volume data elements is defined by three coordinates of a Cartesian coordinate system, however, these planes proceed perpendicularly to one of the coordinate axes.

When the boundary surfaces can be displayed by the display unit together with the displayed image, the region that has been selected can be immediately seen.

The presentation is especially flexible when the boundary surface is interactively displaceable.

DESCRIPTION OF THE PREFERRED EMBODIMENTS

Figure 1:
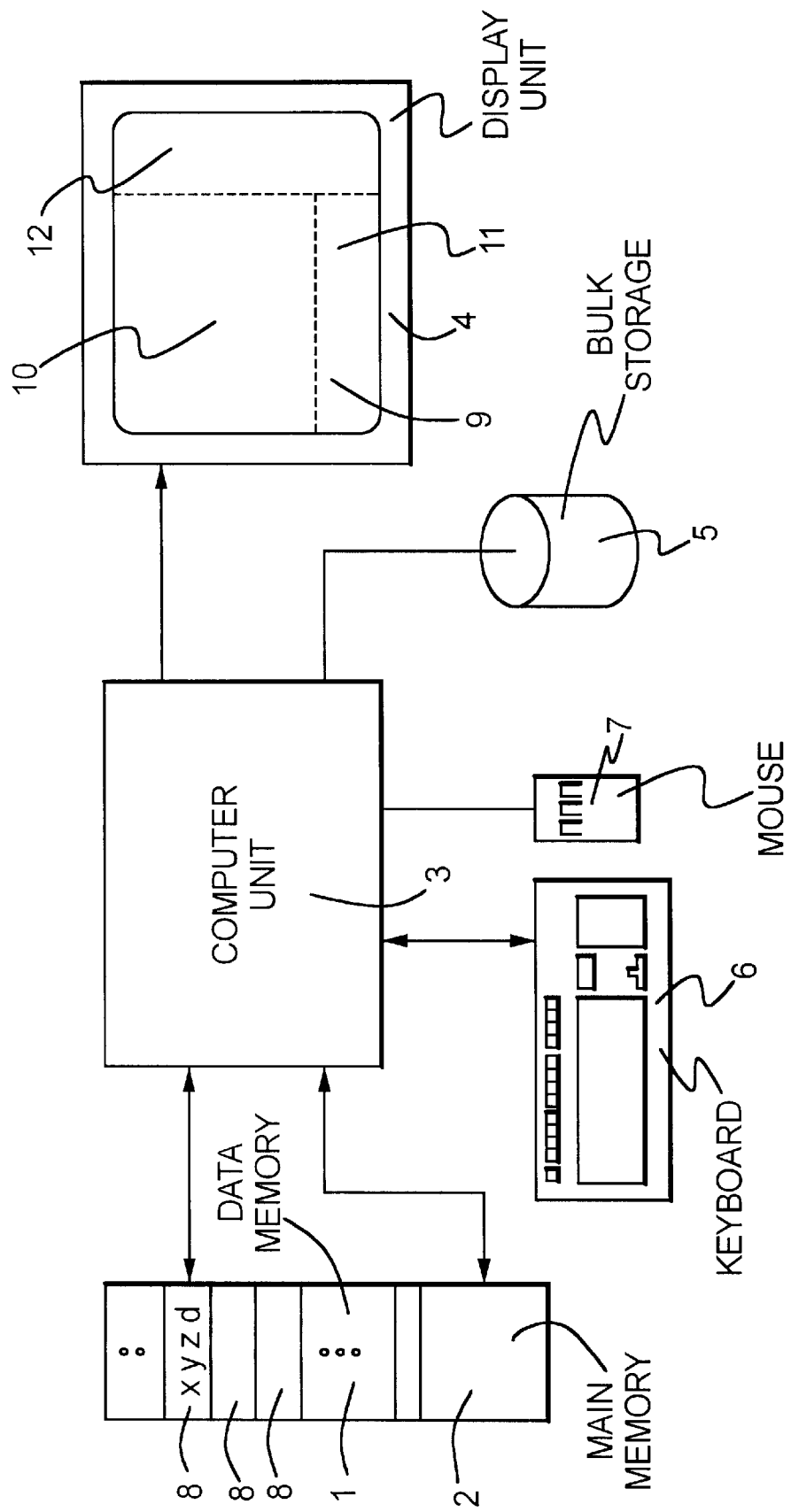
FIG. 1 is a schematic block diagram of a presentation device constructed and operating in accordance with the principles of the present invention.

As shown in FIG. 1, a presentation device has a data memory 1 and a main memory 2 that are connected to a computer unit 3. A display unit 4, a bulk storage 5 as well as input devices are also connected to the computer unit 3.

Figure 2:
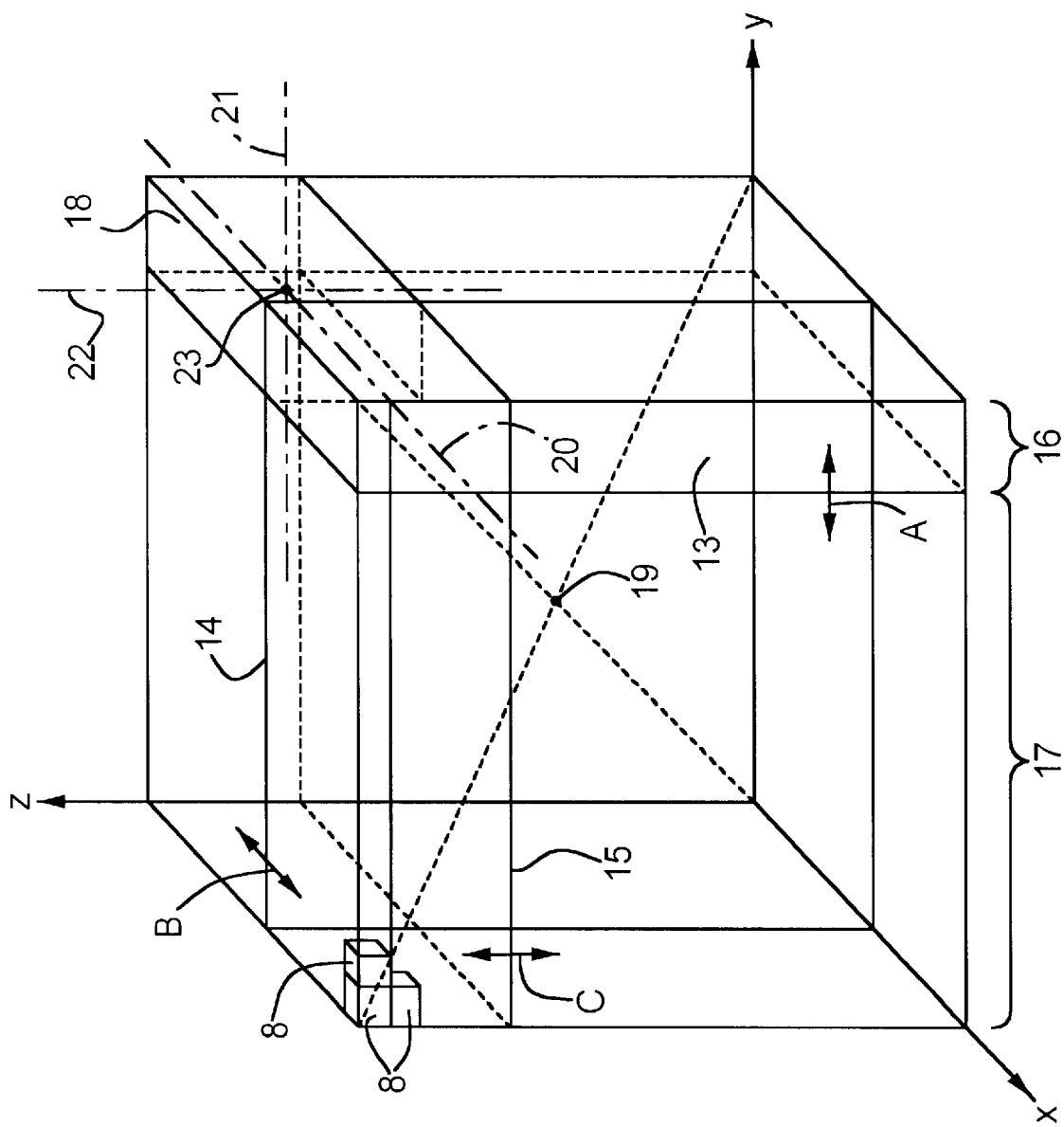
FIG. 2 is a perspective, two-dimensional image of a volume dataset for use in explaining the inventive presentation device.

A volume dataset is stored in the data memory 1. This volume dataset contains a number of volume data elements 8. Three coordinates x, y, z of a Cartesian coordinate system and a data value d are allocated to each volume data element 8. A position (x, y, z) in the volume is thus allocated to each volume data element 8 by the coordinates x, y and z. For clarity, only a few of the volume data elements 8 are also shown in FIG. 2.

An operating system for the computer unit 3, application programs for the computer unit 3 and further data, for example image data for the display unit 4, are stored in the main memory 2.

The display unit 4 is usually a monitor. A two-dimensional image can be displayed via the display unit 4. The bulk storage 5 is usually fashioned as a hard disk. The input devices usually are a keyboard 6 and a mouse control 7. Control commands input via the input devices are queried by the computer unit 3 and processed according to the application program running at the moment.

The volume dataset can be presented as a two-dimensional image on the display unit 4 with the application program. The computer unit 3 determines the image data corresponding thereto from the volume data elements 8 of the volume dataset. The identified image data, which in total produce the two-dimensional image, are then presented on the display unit 4.

As shown in FIG. 1, the display unit 4 has an image region 9 that is in turn subdivided into three sub-regions 10 through 12. The sub-region 10 serves for the actual presentation of the two-dimensional image. A frequency of occurrence distribution (histogram) of the data values d is displayed in the sub-region 11. The sub-region 12 serves as a control panel.

The two-dimensional image presented in the sub-region 10 is a perspective presentation of the volume data elements 8, i.e. a parallel perspective projection. Such a presentation is shown as an example in FIG. 2. In practice, the volume datasets are often self-identifiable. For example, they represent a body part of a human or of an animal. The coordinate axes of the Cartesian coordinate system shown in FIG. 2 are therefore usually not displayed in practice.

A basic boundary surface 13 and auxiliary boundary surfaces 14, 15 can be prescribed for the computer unit 3 via the input devices 6, 7. As shown in FIG. 2, the boundary surfaces 13 through 15 are planes that respectively proceed perpendicularly to one of the coordinate axes. Fundamentally, however, other orientations, for example perpendicular to surface diagonals or perpendicular to spatial diagonals, would also be possible. The boundary surfaces 13 through 15, as can be seen from FIG. 2, are displayed by the display unit 4 together with the two-dimensional image that is presented.

As can be seen from FIG. 2, the volume dataset is divided into a basic selection dataset 16 and a basic remaining dataset 17 by the basic boundary surface 13. The basic selection dataset 16 contains all volume data elements 8 of the volume dataset that lie in the basic boundary surface 13 or to the right thereof. The basic remaining dataset 17 contains all other volume data elements 8 of the volume dataset.

The basic selection dataset 16 is subdivided further by the auxiliary boundary surfaces 14, 15. Only volume data elements 8 that lie in the basic boundary surface 13 and to the right thereof, in the first auxiliary boundary surface 14 and behind it as well as in the second auxiliary boundary surface 15 and above it, are utilized for the determination of the two-dimensional image that is presented in a sub-region 10. As a result, only a cuboid 18 is extracted and presented. The totality of the volume data elements 8 of the cuboid 18 form the selection dataset and the volume they define forms the selection volume. The terms selection dataset, selection volume and cuboid are therefore employed synonymously below.

The cuboid 18 can be substantially smaller than the total volume. As shown in FIG. 2, the cuboid 18 lies clearly outside a volume center of gravity 19 defined by the totality of volume data elements 8 of the volume dataset.

Due to their effect, namely clipping uninteresting parts of the volume dataset, the boundary surfaces 13 through 15 are also often referred to as clip planes.

The prescription of the clip planes and their—usually interactive—displacement is generally standard and known. It is also known to prescribe two clip planes per coordinate axis.

As indicated by double arrows A through C, the boundary surfaces 13 through 15 can be interactively displaced. Generally, the displacement is a shift parallel to one of the coordinate axes. Other shifts may be produced by a linear combination of three shifts respectively parallel to one of the coordinate axes. The displacement, however, also can be a rotation, for example around the mid-point of the respective boundary surface 13 through 15.

The cuboid 18 can be rotated around a basic rotational axis 20 and two auxiliary rotational axes 21, 22. The rotational axes each proceed parallel to one of the coordinate axes. They intersect in a common intersection 23 that thereby forms a fixed point that is independent of the momentary rotation. Any arbitrary rotation thus can be produced by suitable superimposition. The intersection 23 is defined by the center of gravity of the selection volume 18. The rotational axes 20 through 22 thus cut the selection volume 18.

If the rotational axes 20 through 22 do not proceed through the center of gravity of the selection volume 18, they should at least touch the selection volume 18, preferably cut it. As necessary, however, they could be arranged outside the selection volume 18, as long as they proceed in the proximity thereof.

It can be seen from the above comments that the rotational axes 20 through 22 are selected dependent on the positions (x, y, z) of the volume data elements 8 of the selection dataset 18. The selection of the rotational axes 20 through 22 can thereby be carried out interactively by the user. Preferably, however, the rotational axes 20 through 22 are automatically determined by the computer unit 3 dependent on the positions (x, y, z) of the volume data elements 8 of the selection dataset 18.

The method for determining the position of the rotational axes 20 through 22 fundamentally ensues as described below in conjunction with FIG. 3.

Figure 3:
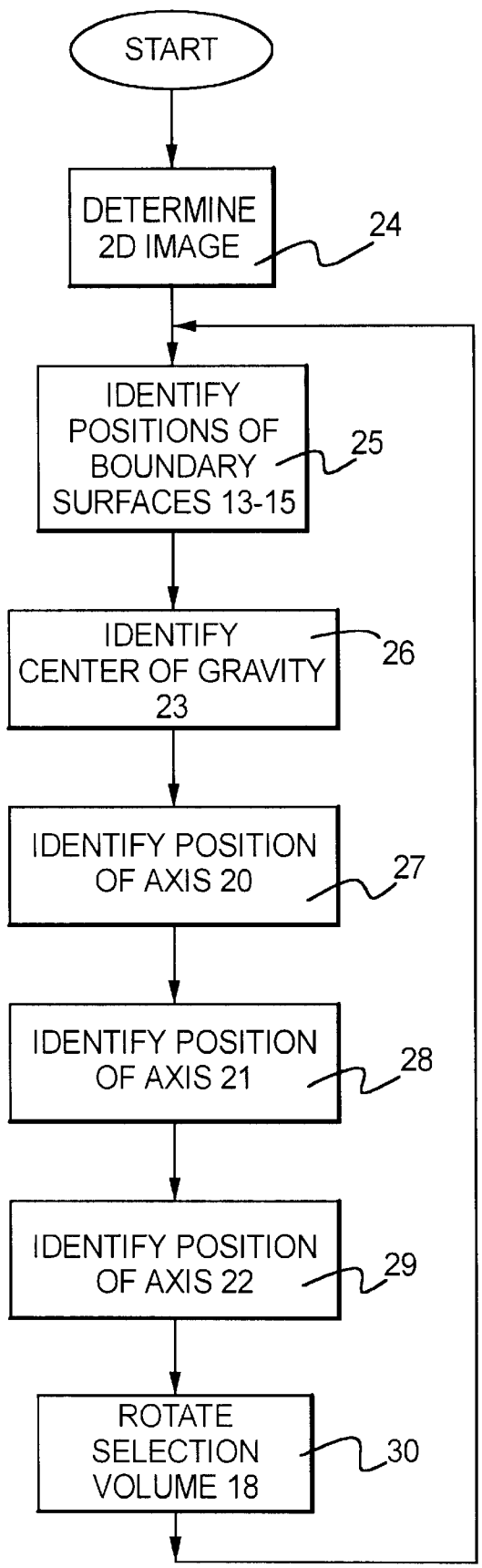
FIG. 3 is a flowchart for illustrating the manner by which an image is displayed on the presentation device in accordance with the invention.

As shown in FIG. 3, a two-dimensional image is first determined in a step 24. This is determined from the volume data elements 8 of the volume dataset and displayed via the display unit 4. In a step 25, the positions of the boundary surfaces 13 through 15 are then queried. In a step 26, the intersection of the rotational axes 20 through 22 is then determined. It is defined by the center of gravity of the selection volume 18.

The positions of the rotational axes 20 through 22 are then determined in steps 27 through 29. The basic rotational axis 20 proceeds parallel to the x-axis; the auxiliary rotational axes 21, 22 proceed parallel to the y-axis and to the z-axis. All three rotational axes 20 through 22 intersect in the intersection 23.

Finally, the selection volume 18 is rotated around the rotational axes 20 through 22 in a step 30.

Figure 4:
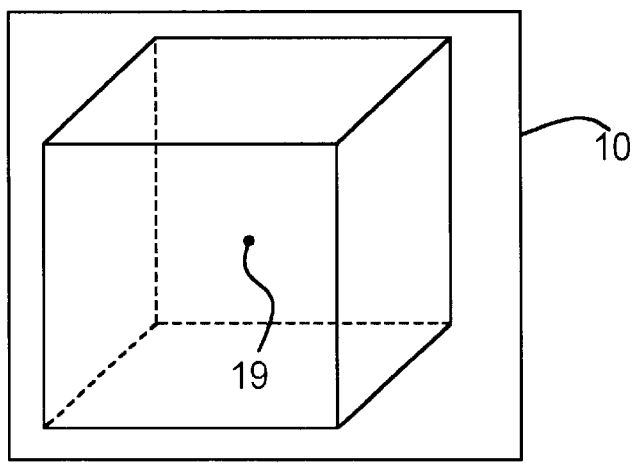
FIG. 4 shows an image with a sub-region as displayed on the inventive presentation device.
Figure 5:
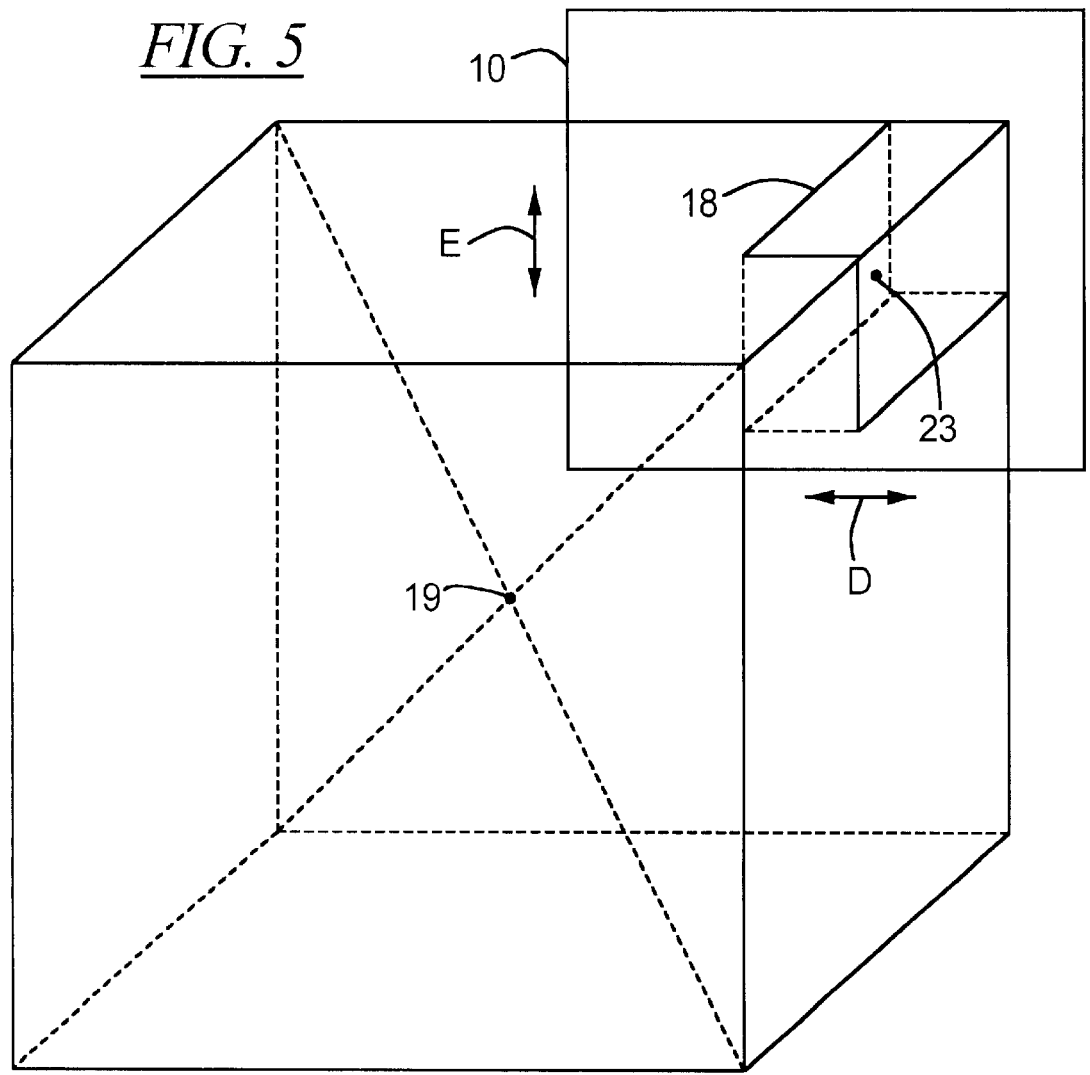
FIG. 5 shows a modification of the image of FIG. 4.

As can be seen from FIGS. 4 and 5, the image can be presented with different imaging scales in the sub-region 10 of the image region 9. The image is thus scalable.

As shown in FIG. 5, the imaging scale can even be selected so large that only an excerpt of the image can be presented in the sub-region 10. In this case, the image can be displaced on the display unit relative to the sub-region 10. This is indicated by double arrows D, E in FIG. 5.

In such a case, the portion of the image that is presented may not contain the volume center of gravity 19 under certain circumstances. The center of gravity of the selection volume 18, by contrast, usually will be presented in the sub-region 10. Particularly in such a case, a rotation of the selection volume 18 around the inventively selected rotational axes 20 through 22 is advantageous.

As stated above, the boundary surfaces 13 through 15 can be displaced or rotated. Both individual boundary surfaces 13 through 15 as well as the boundary surfaces 13 through 15 in common can be displaced or rotated. The boundary surfaces 13 through 15 therefore do not necessarily proceed parallel or perpendicular to one another and do not necessarily proceed perpendicular to the coordinate axes. On the contrary, arbitrary orientations of the boundary surfaces 13 through 15 relative to one another and relative to one another are possible. The selection volume 18 therefore can have a geometrical shaped other than that of a cuboid. The above-described case, however, is the most common. For a number of applications, it can even suffice to orient the boundary surfaces rigidly perpendicular relative to one another and to the coordinate axes.

The inventive presentation device enables a rotation around the center of the selection volume 18 formed by the clip planes (boundary surfaces 13 through 15) as a pivot point. This rotational pivot point is thus dependent on the clip planes that have been set.

Although modifications and changes may be suggested by those skilled in the art, it is the intention of the inventor to embody within the patent warranted hereon all changes and modifications as reasonably and properly come within the scope of his contribution to the art.

I claim as my invention:

1. A presentation device comprising:

a data memory for storing a volume dataset, representing a volume, comprising a plurality of volume data elements, each of said volume data elements having a volume position and a data value allocated thereto, said volume position designating a position in said volume of that volume data element;

a computer connected to said data memory for generating a two-dimensional image of said volume, that is rotatable around a basic rotational axis and around an auxiliary axis, from said volume dataset, with said data elements having respective positions in said image determined by said volume position;

a display connected to said computer for displaying said image;

an input unit connected to said computer for prescribing at least one boundary surface to said computer which is used by said computer to divide said volume dataset into a selection dataset, defining a selection volume having a selection volume center of gravity, and a remaining dataset; and said computer using only volume data elements that are contained in said selection dataset for generating said two-dimensional image, and automatically determining said basic rotational axis and said auxiliary axis dependent on the volume positions of the volume data elements in the selection dataset, so that said auxiliary axis intersects said basic rotational axis and proceeds through said selection volume center of gravity.

2. A presentation device as claimed in claim 1 wherein said selection dataset defines a selection volume, and wherein said basic rotational axis at least touches said selection volume.

3. A presentation device as claimed in claim 2 wherein said basic rotational axis cuts said selection volume.

4. A presentation device as claimed in claim 3 wherein said computer automatically determines said basic rotational axis so that said basic rotational axis proceeds through said selection volume center of gravity.

5. A presentation device as claimed in claim 1 wherein said image is scalable by said computer.

6. A presentation device as claimed in claim 1 wherein said image is displaceable on said display unit via said input unit.

7. A presentation device as claimed in claim 1 wherein said input unit enters a planar boundary surface.

8. A presentation device as claimed in claim 1 wherein said volume position comprises three coordinates of Cartesian coordinate system having three coordinate axes, and wherein said planar boundary surface is perpendicular to one of said coordinate axes.

9. A presentation device as claimed in claim 1 wherein said computer displays said boundary surface on said display unit together with said image.

10. A presentation device as claimed in claim 1 wherein said boundary surface is interactively displaceable via said input unit.

* * * * *